(12) United States Patent
Zhang et al.

(10) Patent No.: US 7,200,579 B2
(45) Date of Patent: Apr. 3, 2007

(54) METHOD AND APPARATUS FOR DETERMINING PRICES THAT MAXIMIZE REVENUE

(75) Inventors: Bin Zhang, Fremont, CA (US); Kay-Yut Chen, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1007 days.

(21) Appl. No.: 10/038,344

(22) Filed: Jan. 2, 2002

(65) Prior Publication Data

US 2003/0126097 A1  Jul. 3, 2003

(51) Int. Cl.
*G06F 17/60* (2006.01)
(52) U.S. Cl. ..................................... 705/400
(58) Field of Classification Search .............. 705/7, 705/35, 36 R, 400, 500
See application file for complete search history.

(56) References Cited

U.S. PATENT DOCUMENTS

2002/0095327 A1* 7/2002 Zumel et al. ................. 705/10

FOREIGN PATENT DOCUMENTS

WO  WO 00/31607  * 6/2000

OTHER PUBLICATIONS

Thomas, Jr., George B., and Finney, Ross L., Calculus and Analytic Geometry, 1992, Addison-Wesley Publishing Company, 8th Edition, pp. 39-40, 208-209.*

* cited by examiner

*Primary Examiner*—John W. Hayes
*Assistant Examiner*—Nathan H. Erb

(57) ABSTRACT

A method and apparatus for determining one or more prices that maximizes revenue for a given demand curve. For determining a single price that maximizes revenue, a geometric analysis of the demand curve is used to find a price that gives a first angle that is equal to a second angle. The first [103] and second [104] angles are calculated using a tangent line that is tangent to the demand curve at the price and reference lines that pass through the demand curve at the price. When the first angle is equal to the second angle [105], the determined price optimizes revenue for the product represented by the demand curve.

20 Claims, 16 Drawing Sheets

METHOD AND APPARATUS FOR DETERMINING PRICES THAT MAXIMIZE REVENUE

FIELD OF THE INVENTION

The present invention pertains to the field of product pricing. More specifically, the present invention relates to a method and apparatus for determining selling prices for products.

BACKGROUND ART

The maximum amount of money that a person is willing to spend on a kind of product, for example, a camera or a car, is called the person's reservation price. The person's reservation price can also be represented as a probability distribution (the probability of a person buying a product at a price). When a product is sold at a single price, the customers with a lower reservation price will not buy the product and the customers with a higher reservation price are not fully exploited.

A demand curve is typically used to represent the relationship between the number of units sold and the price of a product for potential buyers of the product. FIG. 1 (Prior Art) shows an exemplary graph 1 that illustrates a demand curve 2. The number of units sold is indicated on the vertical axis and price is indicated on the horizontal axis. Demand curve 2 shows that the number of units sold decreases as price increases.

The total area under demand curve 2 is the maximum amount of money (revenue) that can be made through selling the product if each customer is fully exploited at his reservation price. However, fully exploiting each customer at his reservation price is impractical as too many different prices must be used. Therefore, in practice, a single price is often chosen. FIG. 1 (Prior Art) shows an exemplary single selling price p. At price p, the number of units sold is n. The area within rectangle 3 represents the revenue that will be obtained from selling n units at price p. It can be seen that the area within rectangle 3 is significantly less than the total area under demand curve 2.

In some instances several prices are used for selling the same product. These different prices are usually supported by differences in the details of functionalities and services that the customer will get. This is called multiple discriminant pricing or product price differentiation. By having multiple prices, a larger area underneath the demand curve is obtained, giving higher revenue. In other words, customers are segmented according to the price that they will pay for the product.

When more than one price is to be used for selling a product, a decision must be made as to how many prices are to be used. Too many different prices on a single product are not practical. However, too few prices for a product will not exploit the potential revenue indicated by the demand curve.

Once the number of prices to be used is determined the prices must be chosen. In practice, prices are typically chosen according to factors independent of the demand curve for the product. Factors that are commonly used include prior experience for similar products, prices for competing products, etc. However, often the chosen prices do not result in maximization of revenue.

Academic exercises are sometimes taught in which simplistic models of a demand curve are studied for the purpose of maximizing revenue. When the demand curve is a straight line or some other simple shape (e.g., a uniform curvature), these models give reasonable results. However, in real life situations, demand curves are complex shapes that are not uniform or simplistic. Typically, demand curves for products have arbitrary shapes that tend to be concave over a large range of prices. These simplistic models do not work on demand curves having arbitrary shapes, even when the arbitrary shapes are concave. Therefore, in real life situations, the techniques of these academic processes are ineffective for determining prices that maximize revenue.

Even more complex are multiple product scenarios. In multiple product scenarios, prices must be determined for several products, each having its own demand curve. Because of the complexity in multiple-product scenarios, prices are often chosen independently for each product, not taking into account the other products during the decision process. This does not result in maximization of revenue for the entire group of products.

Accordingly, there is a need for a method and apparatus that will determine prices that maximize revenue for a given product having a demand curve. Also, there is a need for a method and apparatus that will determine either a single price or multiple prices that maximize revenue for a demand curve having an arbitrary shape that is concave. In addition, a method and apparatus is needed that meets the above need and that can determine prices that maximize revenue in a multiple product environment.

SUMMARY OF THE INVENTION

The present invention provides for determination of prices that maximize revenue for a product having a demand curve. Also, the present invention allows for determination of either a single price or multiple prices that maximize revenue for a demand curve having an arbitrary shape that is concave. In addition, the method and apparatus of the present invention determines prices that maximize revenue in a multiple product environment.

In one embodiment, a method for determining a price that maximizes revenue is disclosed. First, a demand curve is provided. The term "demand curve" as used herein includes any data or indicia that indicates a relationship between price and demand for a product or products and the term specifically includes customer valuation distributions and demand distributions. The demand curve is used to calculate a first angle that extends between a first reference line and a second reference line. Both the first reference line and the second reference line pass through the demand curve at the price. The first reference line is parallel to the x-axis (price) and the second reference line passes through the origin.

A second angle is calculated by determining the angle between the first reference line and a line running tangent to the demand curve at the price. A determination is then made as to whether the first angle is equal to the second angle. When the first angle is not equal to the second angle, the price is changed and the steps of calculating the first angle, calculating the second angle and determining whether the first angle is equal to the second angle are performed until a price is found at which the first angle is equal to the second angle. When the first angle is equal to the second angle, the determined price optimizes revenue for the product represented by the demand curve.

A method is also disclosed for determining multiple prices that maximize revenue for a product having a given demand curve. In this embodiment a geometric calculation is performed using a first price so as to determine a plurality of additional prices. The geometric error associated with the first price and the additional prices is then determined. The first price is changed when the first price does not minimize the geometric error and the steps of performing the geometric calculation, determining the geometric error and changing the first price are repeated until a first price is found that minimizes the geometric error. The prices that minimize the geometric error optimize revenue for the product represented by the demand curve.

A method is also disclosed for determining prices that maximize revenue for multiple products. In this embodiment an initial price is determined for each product that is proportional to the cost of each product. Additional prices are determined that maximize revenue for each product. The total cost of the products is determined and is compared to a total budget. When the total cost of the products is not equal to the budget, the multiplier is changed so as to change the initial price. The steps of determining an initial price, determining a plurality of additional prices, determining the total cost, and changing the multiplier are repeated until the total cost of the products is equal to the budget. Once the total cost is equal to the budget, prices are obtained for each of the products that maximize revenue while meeting budgetary constraints.

Accordingly, the method and apparatus of the present invention determines prices that maximize revenue for a product having a demand curve. Also, the method and apparatus of the present invention determines either a single price or multiple prices that maximize revenue for a demand curve having an arbitrary shape that is concave over a large range of prices. In addition, the method and apparatus of the present invention determines prices that maximize revenue in a multiple product environment.

Other features and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic information capable of being stored, transferred, combined, compared, and otherwise manipulated in a computer system. It has proven convenient at times, principally for reasons of common usage, to refer to these information as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "analyzing," "determining," "calculating," "changing," "performing" or the like, refer to actions and processes of a computer system or similar electronic computing device. The computer system or similar electronic computing device manipulates and transforms data represented as physical (electronic) quantities within the computer system memories, registers or other such information storage, transmission or display devices.

Exemplary Computer System

Figure 1:
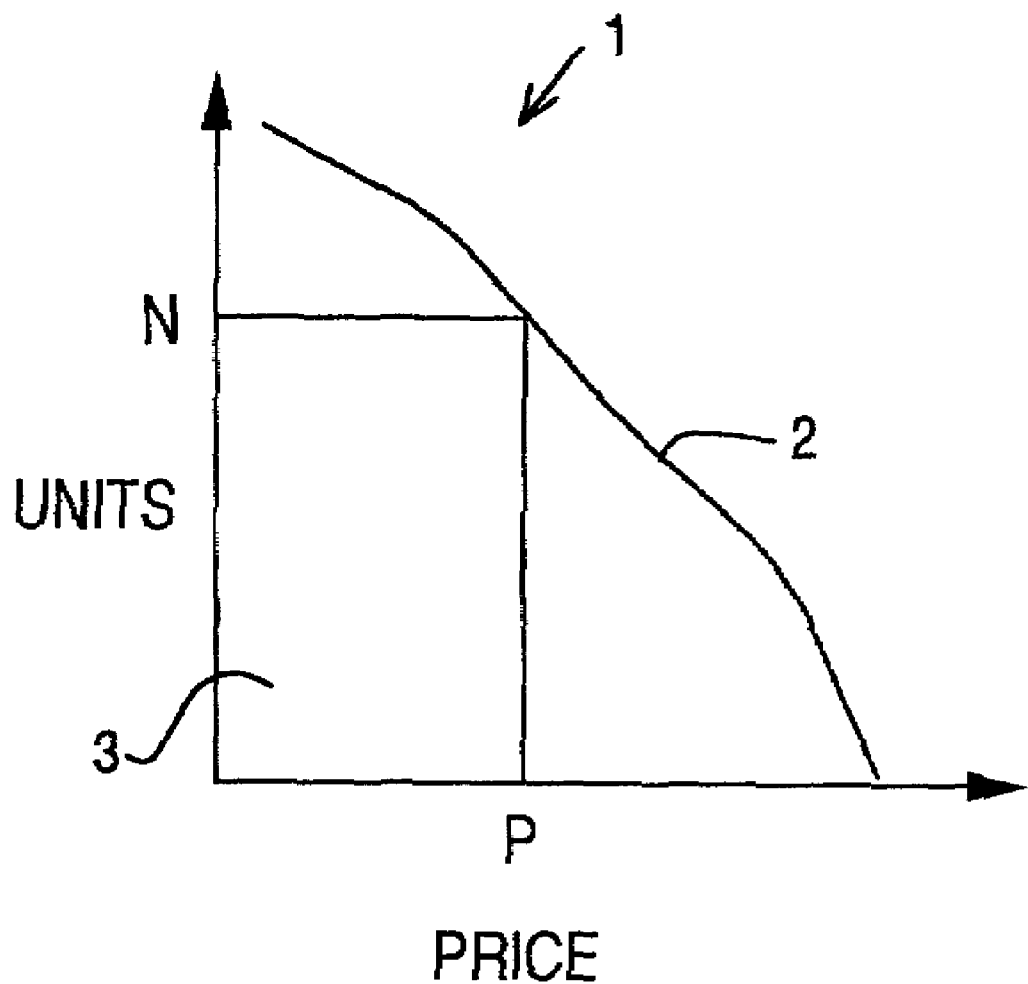
FIG. 1 (Prior Art) is a graph that illustrates an exemplary demand curve and that illustrates an exemplary price, the number of units that would be sold at that price, and the revenue that would be obtained.
Figure 2:
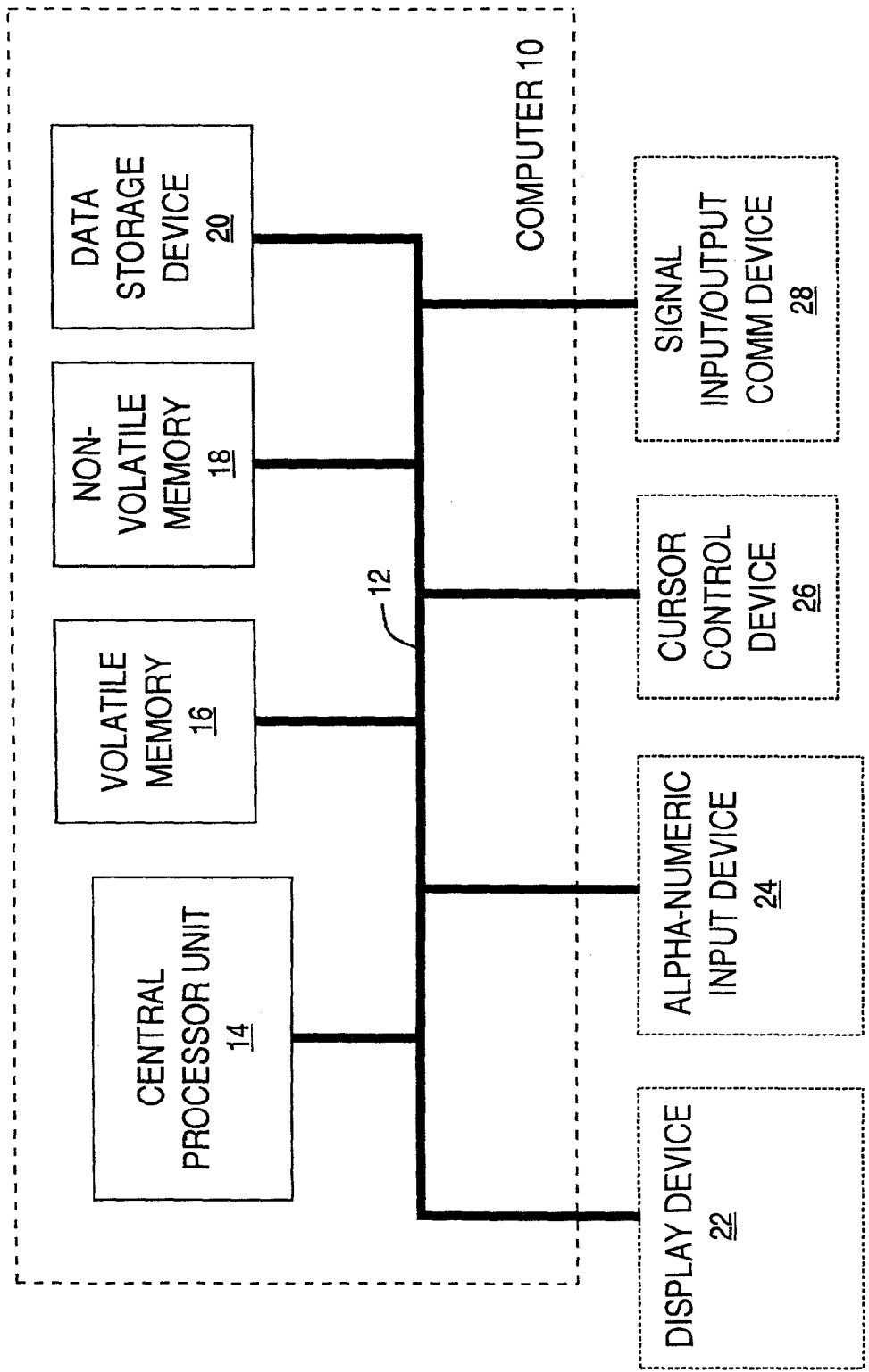
FIG. 2 is a block diagram illustrating an exemplary computer system in accordance with one embodiment of the present invention.

In general, computer system 10 of FIG. 2, used by an embodiment of the present invention, comprises an address/data bus 12 for communicating information, one or more central processors 14 coupled with bus 12 for processing information and instructions. Central processor unit 14 may be a microprocessor or any other type of processor. The computer system 10 also includes data storage features such as a computer usable volatile memory unit 16 (e.g., random access memory, static RAM, dynamic RAM, etc.) and non-volatile memory unit 18 that are coupled with bus 12 for storing information and instructions for processor(s) 14. System 10 also includes an optional signal input and output communication device 28 coupled with bus 12 for enabling computer system 10 to interface with other electronic devices. In one embodiment of the present invention, input and output device 28 is a serial communication port, but could also use any number of well known communication standards and protocols, e.g., Universal Serial Bus (USB), Ethernet, FireWire (IEEE 1394), parallel, small computer system interface (SCSI), infrared (IR) communication, Bluetooth wireless communication, etc.

Computer system 10 also includes a data storage device 20 ("disk subsystem") such as a magnetic or optical disk and disk drive coupled with the bus 12 for storing information and instructions. Data storage device 20 can include one or more removable magnetic or optical storage media such as disk drives, magnetic tape, Compact Discs (CD's), Digital Video Discs (DVD's), etc.

Optionally, computer system 10 can include a display device 22 that is coupled to bus 12 for displaying graphics and/or video. It should be appreciated that optional display device 22 may be a cathode ray tube (CRT), flat panel liquid crystal display (LCD), field emission display (FED), or any other display device suitable for displaying video and/or graphic images and alphanumeric characters recognizable to a user. Furthermore, system 10 can include an optional alphanumeric input device 24 including alphanumeric and function keys coupled to the bus 12 for communicating information and command selections to the central processor(s) 14. Additionally, the computing device 10 of FIG. 2 can include an optional cursor control device 26 coupled to the bus 12 for communicating user information and command selections to the central processor(s) 14.

Method for Determining Price that Maximizes Revenue

Figure 3:
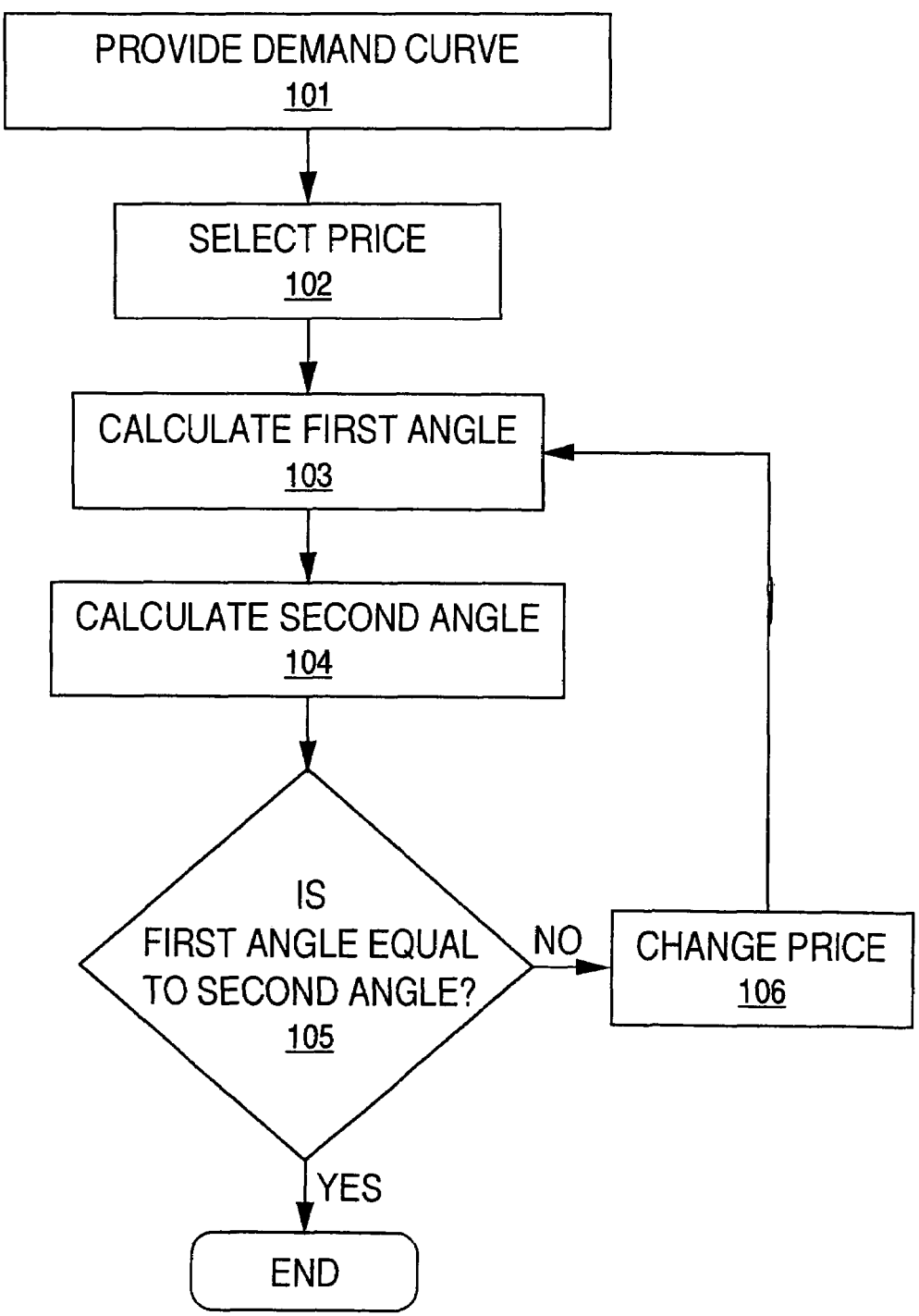
FIG. 3 is a block diagram that illustrates a method 100 for determining a price for a product that maximizes revenue in accordance with one embodiment of the present invention.

Referring now to FIG. 3, a method 100 for determining a price that maximizes revenue is shown. In one embodiment, method 100 is performed using software implemented in a computer system such as computer system 10 illustrated in FIG. 2. Alternatively, hardware or firmware can be used to perform method 100.

First, as shown by step 101, a demand curve is provided. In the present embodiment a demand curve can be used that has an arbitrary structure. The demand curve should be generally concave over a large range of prices. A price is then selected as shown by step 102. In the present embodiment, the initial price is chosen to be the lowest price on the demand curve provided in step 101. However, other prices could be used as an initial price.

Figure 4A:
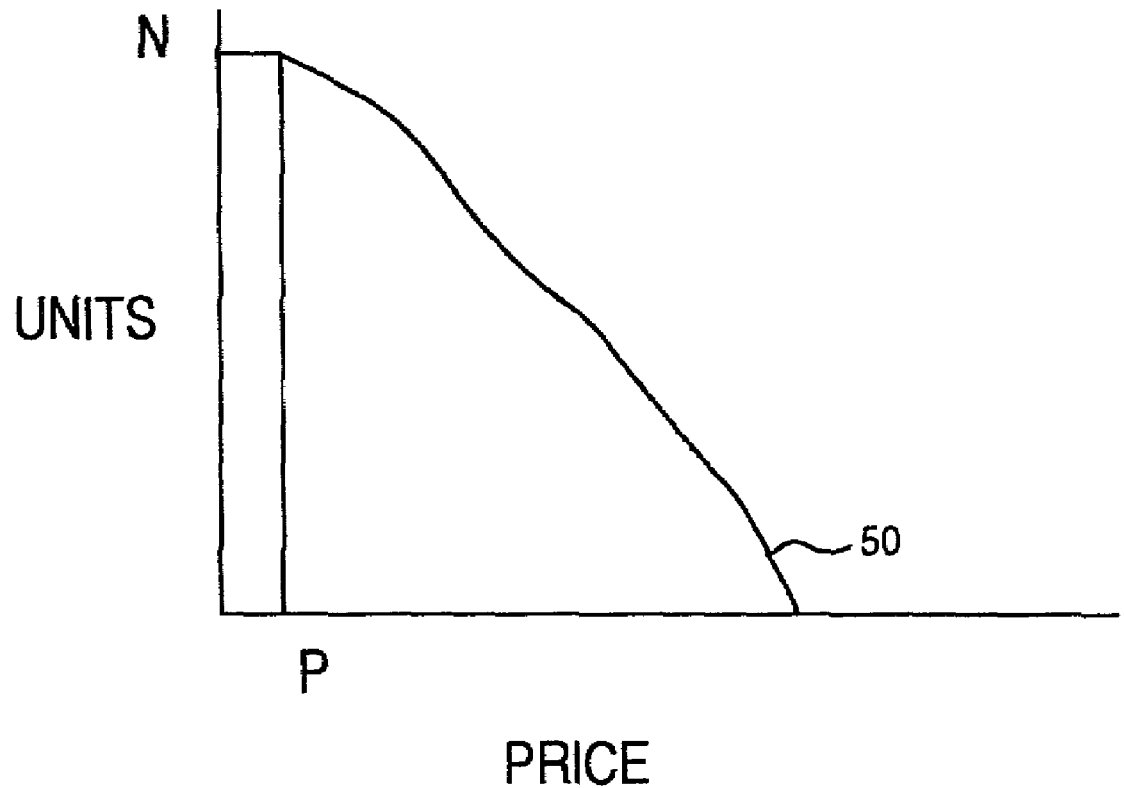
FIG. 4A shows a demand curve and a first reference line for a selected initial price p in accordance with an embodiment of the present invention.

FIG. 4A illustrates a graph that shows a demand curve 50 having an arbitrary structure that is concave. Number of units is indicated on the vertical axis and price is indicated on the horizontal axis. Price can be in dollars, pounds, or in any desired monetary unit. In the embodiment shown in FIG. 4A, an initial price p is selected. It can be seen that price p is the lowest price on demand curve 50.

As shown by step 103 a first angle is calculated. In the present embodiment the first angle is calculated by determining the angle between a first reference line and a line running tangent to the demand curve at the price selected in step 102. The first reference line is a line that is parallel to the second axis and that passes through the demand curve at the price selected in step 102.

Figure 4B:
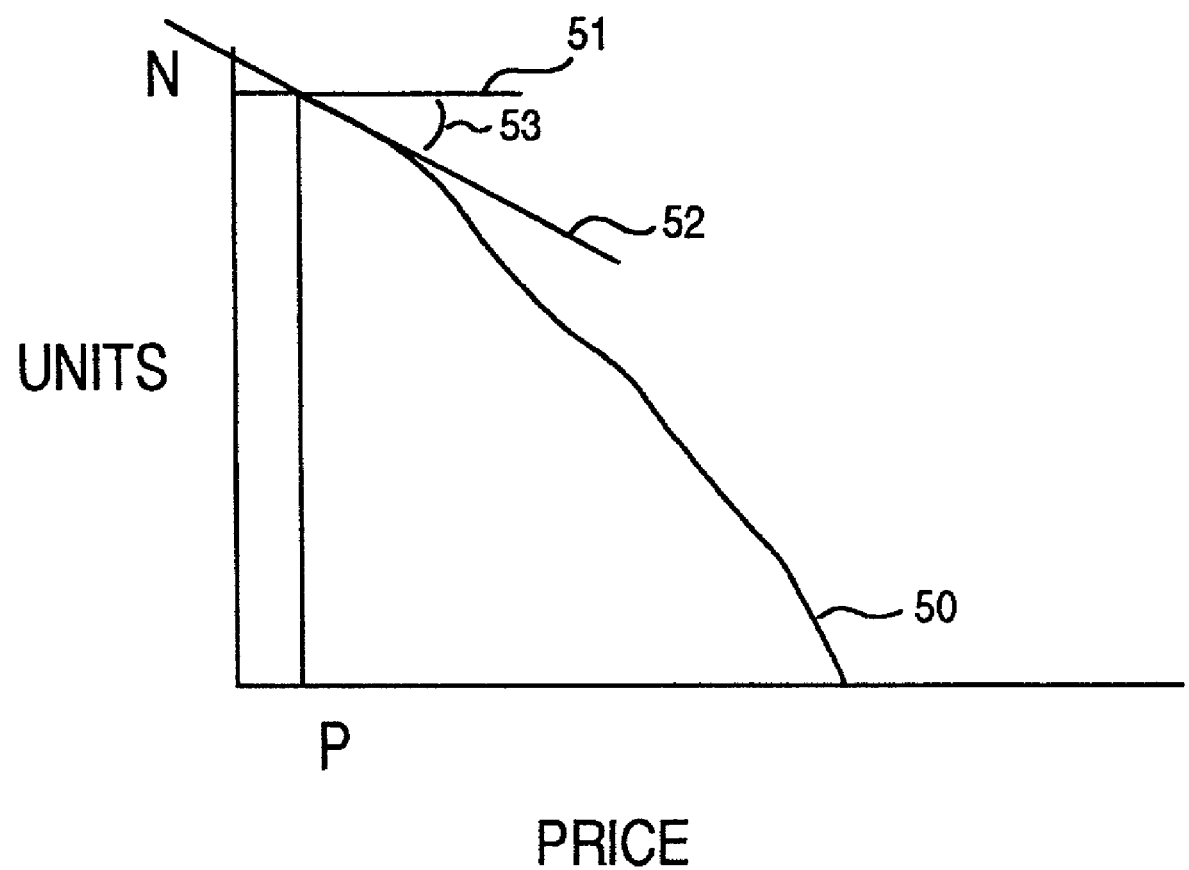
FIG. 4B shows the structure of FIG. 4A and illustrates calculation of a first angle in accordance with an embodiment of the present invention.
Figure 4C:
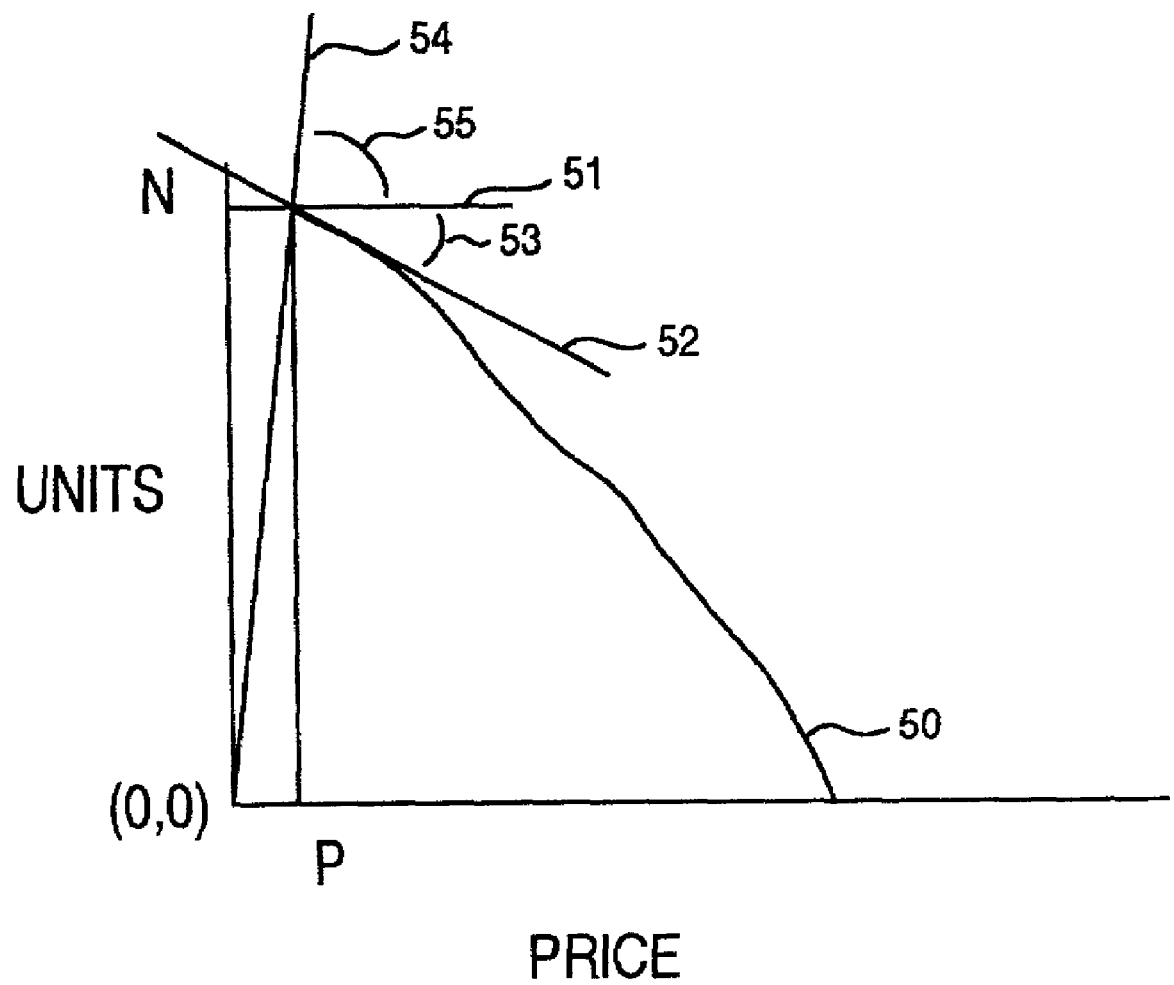
FIG. 4C shows the structure of FIG. 4B and illustrates calculation of a second angle in accordance with an embodiment of the present invention.

FIGS. 4B–4C illustrate an exemplary calculation of a first angle, shown as angle 53. First, tangent line 52 is determined by calculating the tangent to demand curve 50 at price p. First reference line 51 is determined by drawing a line that runs parallel to the horizontal axis and that intersects the demand curve at price p. The first angle, shown as angle 53, is the angle between the first reference line 51 and tangent line 52. The first angle can be calculated manually or in an automated fashion. In one embodiment computer 10 of FIG. 2 is used to calculate the first angle 53.

As shown by step 104, a second angle is determined. In the present embodiment the second angle is determined by calculating the angle between the first reference line and a second reference line. The second reference line passes through the origin and passes through the demand curve at the price selected in step 102. The second angle can be calculated manually or in an automated fashion. In one embodiment computer 10 of FIG. 2 used to calculate the second angle.

FIG. 4C illustrates determination of the second angle in accordance with one embodiment of the present invention. First, the second reference line 54 is drawn. Second reference line 54 is the line that runs through the origin (0,0) and that passes through the demand curve at price p. In the embodiment shown in FIG. 4C, the second angle, shown as angle 55, is shown to extend between first reference line 51 and second reference line 54.

A determination is made as to whether the first angle is equal to the second angle as shown by step 105. In the present embodiment, computer 10 of FIG. 2 compares the first angle (e.g., angle 53 of FIG. 4C) to the second angle (e.g., angle 55 of FIG. 4C).

Referring to steps 105 and 106, if the first angle is not equal to the second angle, the price is changed. In the present embodiment, the price is incremented by a single increment (e.g., one-cent). Steps 103–105 are again performed using the new price. This process is repeated for each point along the demand curve until step 105 determines that the first angle is equal to the second angle. When the first angle is equal to the second angle, the price maximizes revenue and the process ends.

Figure 4D:
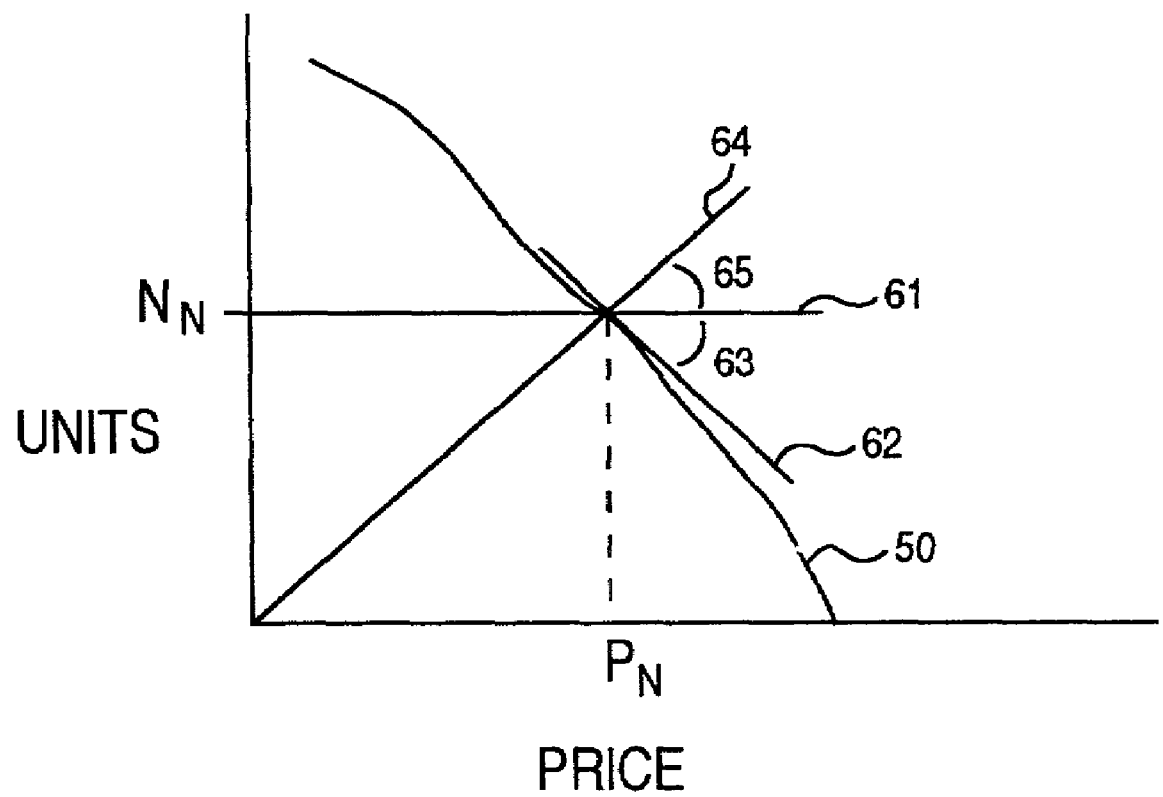
FIG. 4D illustrates performance of steps of method 100 of FIG. 3 at an exemplary price $P_n$ that maximizes revenue in accordance with an embodiment of the present invention.

FIG. 4D illustrates method 100 at a price $p_n$, that maximizes revenue. As method 100 moves along the demand curve, the price is changed to $p_n$ (step 106 of FIG. 3). A first angle 63 is calculated (step 103 of FIG. 3) by determining the tangent to demand curve 50 at price $p_n$, shown as tangent line 62. Then first reference line 61 is determined by drawing a line that runs parallel to the horizontal axis and that intersects the demand curve at price $p_n$. The first angle 63 extends between the first reference line 61 and tangent line 62.

The second angle 65 is then determined (step 104 of FIG. 3). First, the second reference line 64 is drawn. Second reference line 64 is the line that runs through the origin (0,0) and that passes through the demand curve at price $p_n$. The second angle, shown as angle 65, extends between first reference line 61 and second reference line 64. In the embodiment shown in FIG. 4D, first angle 63 is equal to second angle 65. Therefore, the process ends with the price $p_n$, maximizing revenue for demand curve 50.

Accordingly, method 100 allows for determining a single price that maximizes revenue for a given demand curve. Because method 100 allows for use of a demand curve that has an arbitrary structure, a price can be determined for actual products in real-life market conditions. That is, because demand curves for products almost always have an arbitrary structure, method 100 allows for determination of pricing for a product. Also, because method 100 allows for calculation of pricing using a demand curve having an arbitrary structure, pricing can be determined for demand curves other than demand curves having a simplistic structure such as a straight line or a uniform curvature.

Method for Determining Multiple Prices that Maximize Revenue

Figure 5:
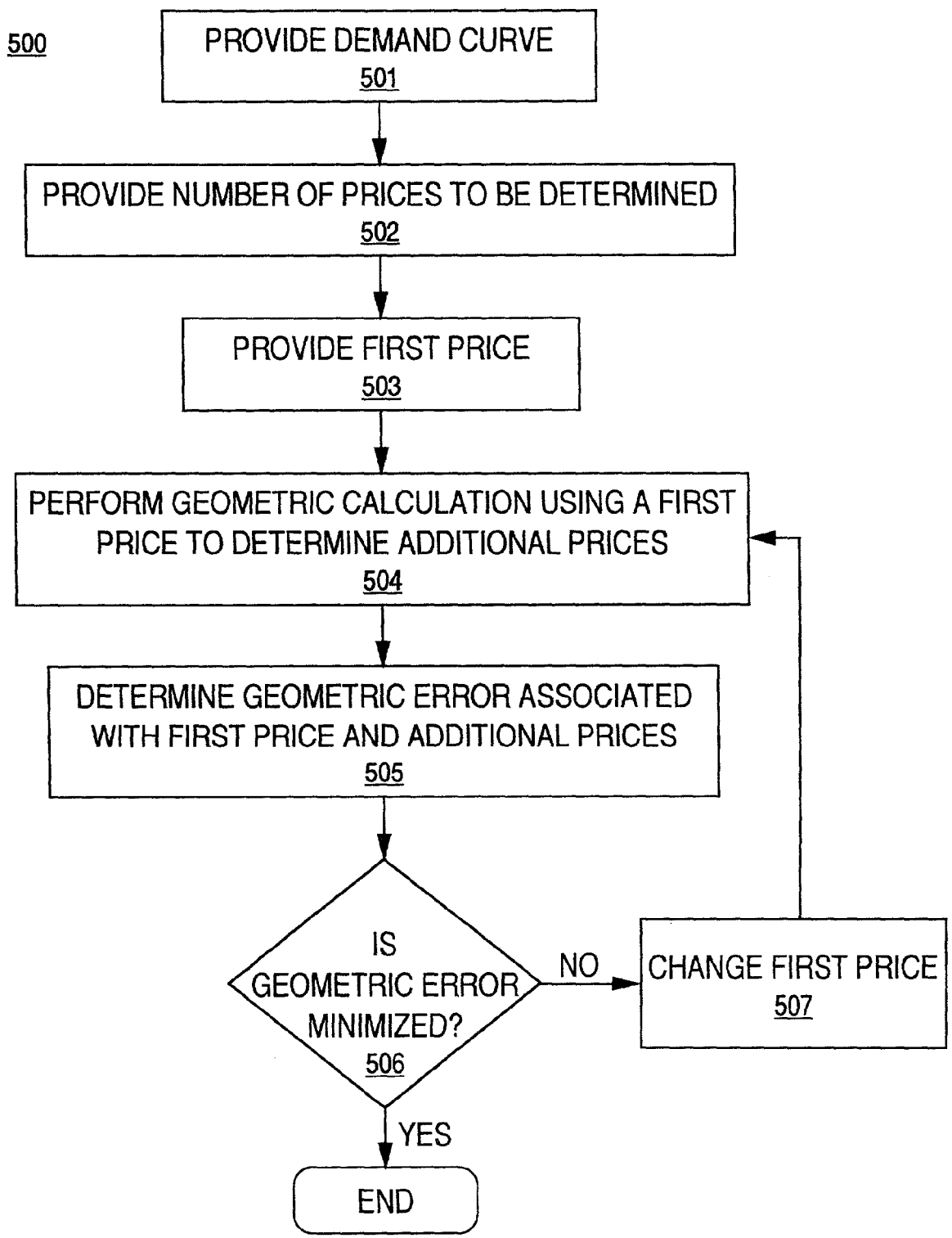
FIG. 5 shows a method for determining multiple prices that maximize revenue for a demand curve in accordance with an embodiment of the present invention.

FIG. 5 shows a method for determining multiple prices that maximize revenue for a demand curve in accordance with an embodiment of the present invention. As shown by step 501 a demand curve is provided. The number of prices to be determined is also provided as shown by step 502.

As shown by step 503, a first price is provided. In the present embodiment, the lowest price on the demand curve is selected as the first price. However, alternatively, other methods could be used to select a first price.

Referring now to step 504, a geometric calculation is performed using the first price to determine additional prices. More particularly a geometric calculation is performed to determine a number of additional prices such that the total number of prices equals the number of prices provided in step 502. For example, if the number of prices provided in step 502 is three, two additional prices will be determined in the geometric calculation (two plus the first price gives three total prices).

As shown by step 505, the geometric error associated with the first price and the additional prices is determined. In the present embodiment, geometric error is the amount by which a geometric intersection of lines deviates from zero units (i.e., the x-axis) which is indicated as number of units of deviation.

Referring now to step 506 a determination is made as to whether geometric error is minimized. In one embodiment, step 506 determines whether geometric error exceeds a predetermined threshold. In one embodiment, the threshold is a number of units of deviation from zero units (the x-axis). In one embodiment, the threshold is one unit. This means that the geometric error cannot deviate from the x-axis by more than one unit.

When the geometric error is not minimized as shown by steps 506 and 507 the first price is changed and steps 504–506 are performed until a first price is reached that minimizes geometric error. In the present embodiment, the first price is incremented by one unit (e.g. one cent) at Step 507. However, alternatively other price increments and/or varying price increments could also be used.

Continuing with step 506, when the geometric error is minimized the most recently determined first price and additional prices maximize revenue for the given demand curve and the process ends.

In one embodiment of the present invention, the first price that is provided in step 503 is not the lowest price on the demand curve. In this embodiment, the first price is changed (step 507) according to the determined geometric error. More particularly, when the geometric error is positive (the intersection is above the x-axis), the first price is increased and when the geometric error is negative (the intersection is below the x-axis), the first price is decreased. This gives quick conversion to the set of prices (first price and additional prices) that maximize revenue.

Figure 6:
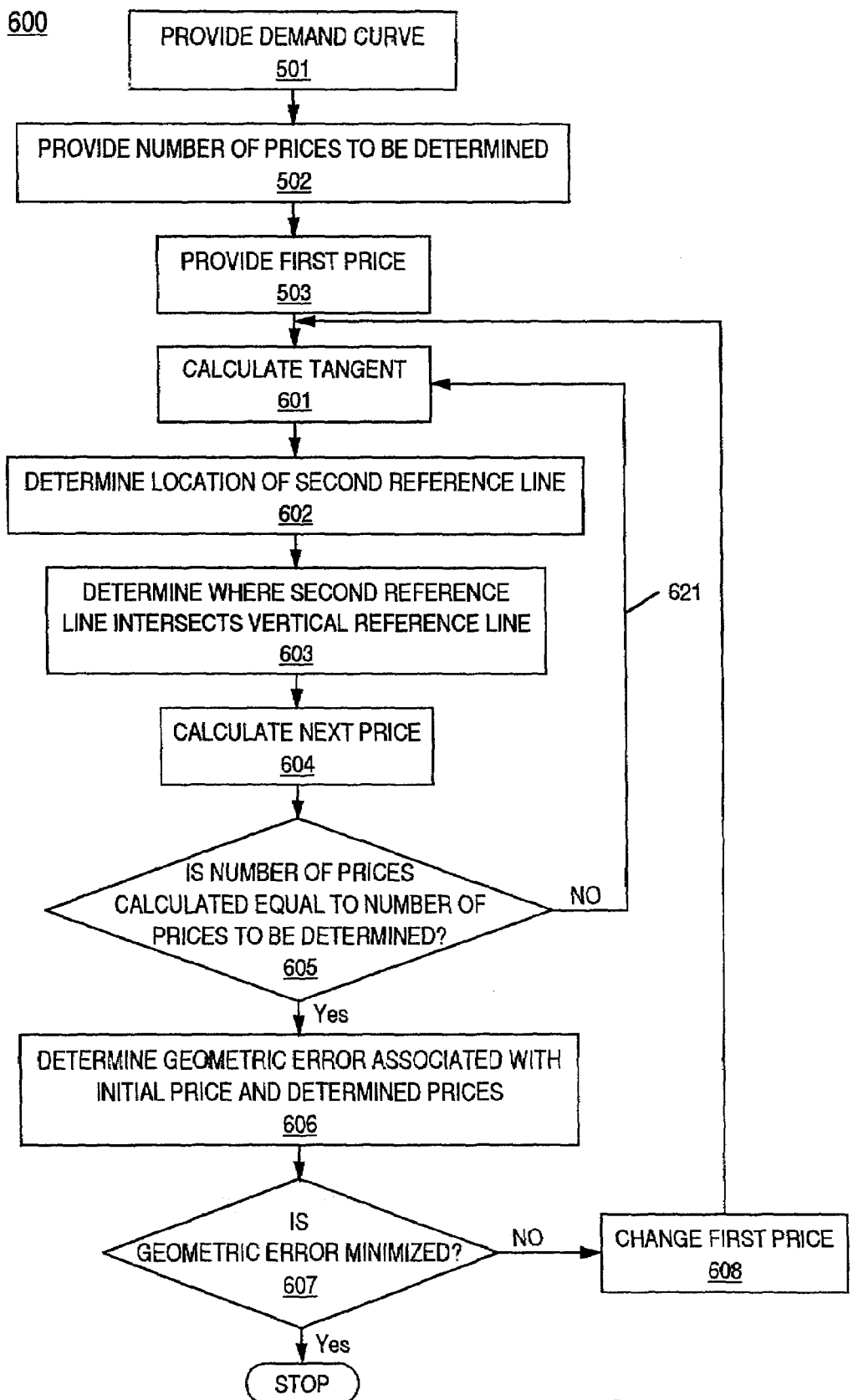
FIG. 6 illustrates a more detailed method for determining multiple prices that maximize revenue in accordance with an embodiment of the present invention.

FIG. 6 illustrates a more detailed method 600 in which a plurality of prices are determined that maximize revenue for a given demand curve. As shown by steps 501–503 of method 500 a demand curve is provided, the number of prices to be determined is provided, and a first price is provided.

Figure 7A:
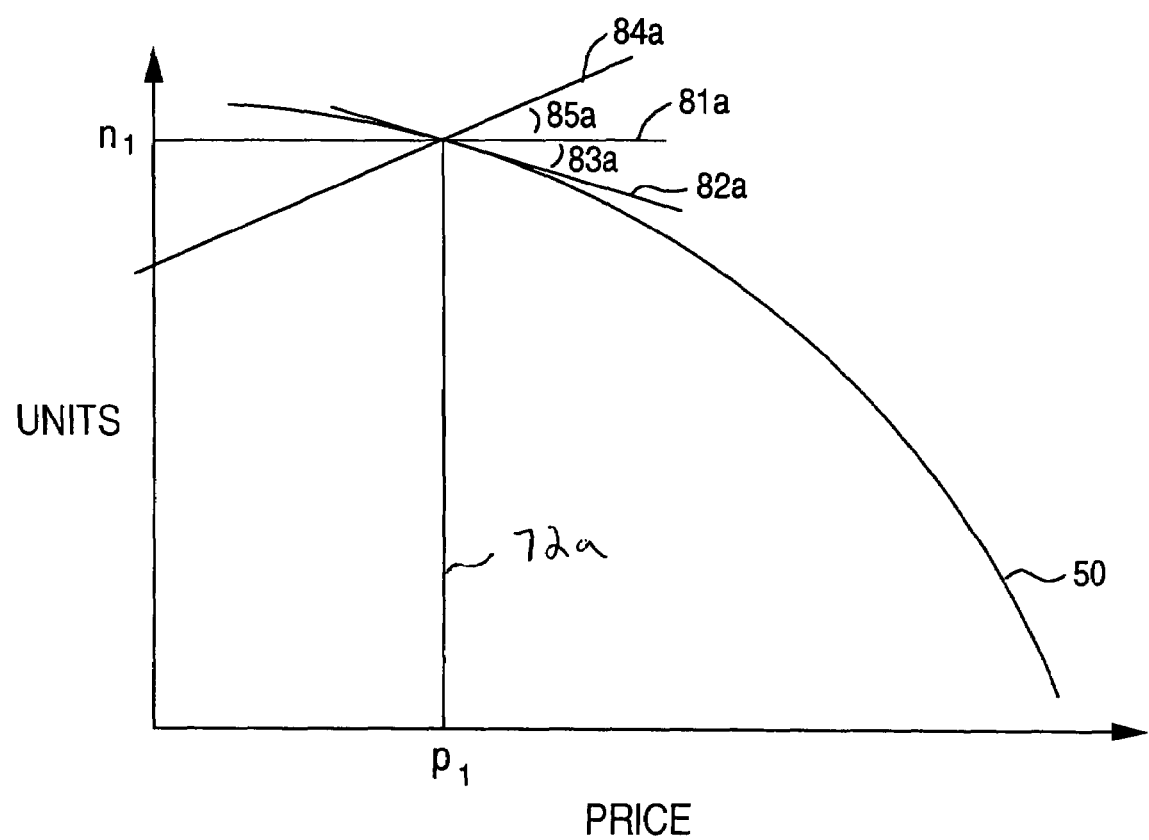
FIG. 7A shows an exemplary demand curve and illustrates steps of the method 600 of FIG. 6 for determining three prices in accordance with an embodiment of the present invention.

FIGS. 7A–7D illustrate method 600 for an exemplary demand curve 50. Referring now to FIG. 7A, a first price $p_1$ is shown that intersects demand curve 50 at $n_1$ units. Third reference line 72a extends from the x-axis to demand curve 50 and extends parallel to the y-axis at a price of $p_1$.

Referring now to step 601 the tangent is calculated. More particularly, the line that is tangent to the demand curve at the first price input in step 503 is calculated. In the embodiment shown in FIG. 7A, tangent line 82a is shown. Tangent line 82a is tangent to demand curve 50 at first price $p_1$.

As shown by step 602 a second reference line is located. In the present embodiment, the second reference line is determined relative to a first reference line that is parallel to the x-axis and that runs through the demand curve at the first price. Geometrically, the second reference line can be determined by flipping the tangent line over the first reference line. Another way to determine the second reference line is to determine the angle between the first reference line and the tangent line and to draw a line that is located on the opposite side of the first reference line at an equal angle and which extends through the demand curve at the first price.

Figure 7B:
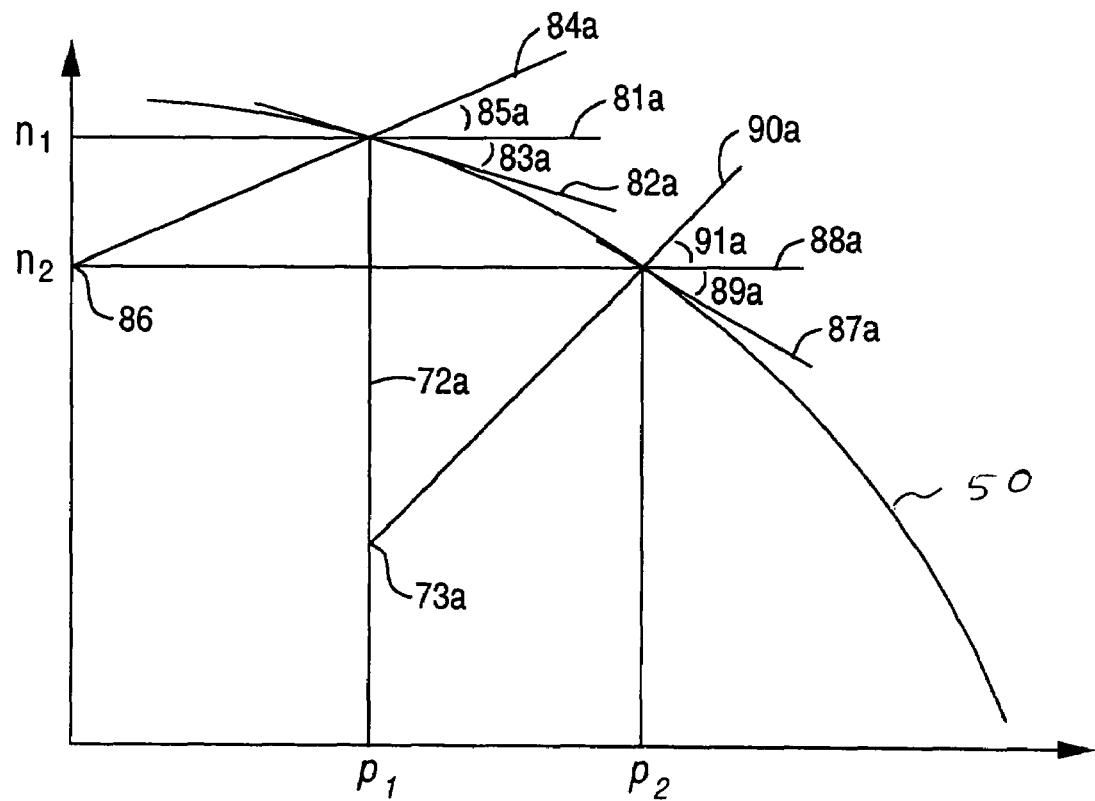
FIG. 7B shows an exemplary demand curve and illustrates steps of method 600 of FIG. 6 for determining three prices in accordance with an embodiment of the present invention.

Referring to FIG. 7B, first reference line 81a is determined by generating a line that is parallel to the x-axis and that intersects the demand curve at price $p_1$. Angle 83a is the angle that extends between first reference line 81a and tangent line 82a. A second reference line 84a is located such that angle 85a is equal to angle 83a. Any of a number of methods can be used to determine the location of second reference line 84a. In one embodiment, a line that has an angle equal to angle 83a is drawn such that the line intersects demand curve 50 at price $p_1$.

The intersection of the second reference line and a vertical reference line is determined as shown by step 603. In the case of the first price, the vertical reference is the y-axis. Therefore, a determination is made as to where the second reference line intersects the y-axis. In the embodiment shown in FIG. 7B, the intersection is at point 86 on the y-axis which corresponds to a number of units shown as $n_2$.

The next price is calculated as shown by step 604. In the present embodiment, the next price is calculated by determining the price that corresponds to the number of units determined in step 603. Geometrically this is determined by drawing a line parallel to the x-axis that intersects the y-axis at the same point as the second reference line and drawing a line downward vertically from the demand curve where the line intersects the demand curve. In the embodiment shown in FIG. 7B, the next price $p_2$ is shown to be the price that corresponds to number of units $n_2$ along demand curve 50.

Referring now to step 605, if the total number of prices does not equal the number of prices provided in step 502, steps 601–604 are repeated until the number of prices determined equals the number of prices provided in step 502. For example, if the number of prices provided in step 502 is three, two additional prices will be determined (by looping as shown by line 621 twice so as to perform each of steps 601–605 two additional times).

In the embodiment shown in FIG. 7B, a step 601 is performed so as to calculate tangent line 87a that is tangent to demand curve 50 at price $p_2$. In step 602, first reference line 88a is determined by generating a line that is parallel to the x-axis and that intersects the demand curve at price $p_2$. Angle 89a is the angle that extends between first reference line 88a and tangent line 87a. Referring now to FIG. 7B second reference line 90a is located such that angle 91a is equal to angle 89a.

Figure 7C:
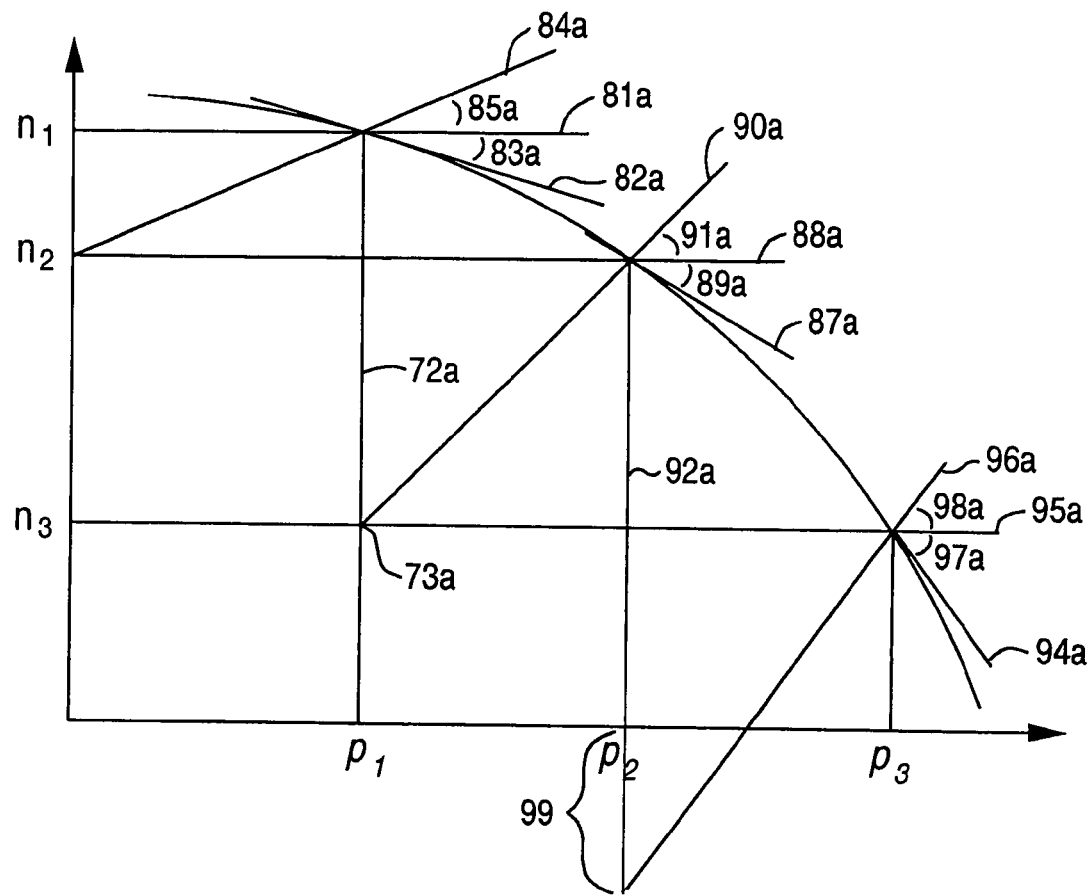
FIG. 7C shows an exemplary demand curve and illustrates steps of method 600 of FIG. 6 for determining three prices in accordance with an embodiment of the present invention.

For the first price $p_1$ the vertical reference line is the y-axis. For all other prices, the vertical reference line is a line that runs vertically at the previously determined price. Thus, the vertical reference line is moved to a subsequent determined price (e.g., prices $p_1$–$p_3$) after each calculation of a new price. In the present embodiment, vertical reference line 72a is used (which extends vertically at price $p_1$) for determining the intersection with the second reference line 90a that passes through price $P_2$. The intersection of the second reference line 90a and vertical reference line 72a is (step 603) point 73a. Referring now to FIG. 7C, point 73a corresponds to a number of units shown as $n_3$. The corresponding price $p_3$ is then calculated (step 604).

When the number of prices calculated is equal to the number of prices to be determined (input in step 502) the geometric error associated with the first price and the additional prices is determined as shown by step 606. In the present embodiment, geometric error is the amount by which a geometric intersection of lines deviates from zero units (i.e., the x-axis) that is indicated as number of units of deviation.

In the present embodiment, geometric error is determined by performing steps 601–603 for the last determined price point. In the embodiment shown in FIG. 7C, tangent line 94a is calculated and first reference line 95a are calculated, giving a second reference line 96a that is disposed at an angle 98a that is equal to angle 97a. The geometric error is the vertical deviation between the point at which the second reference line 96a intersects vertical reference line 92a and the x-axis, shown as error 99.

Referring now to step 607 a determination is made as to whether geometric error is minimized. In one embodiment, step 607 determines whether geometric error exceeds a predetermined threshold. In the present embodiment, the threshold is one unit (above or below the x-axis).

When the geometric error is not minimized as shown by steps 607 and 608 the first price is changed and steps 601–607 are again repeated using the newly determined first price. In the present embodiment, the first price is incremented by one unit (e.g. one cent) each time that the first price is changed. This process continues (steps 601–608 are performed) until prices are found at which geometric error is minimized. Continuing with step 607, when the geometric error is minimized the most recently determined first price and additional prices maximize revenue for the given demand curve and the process ends.

Figure 7D:
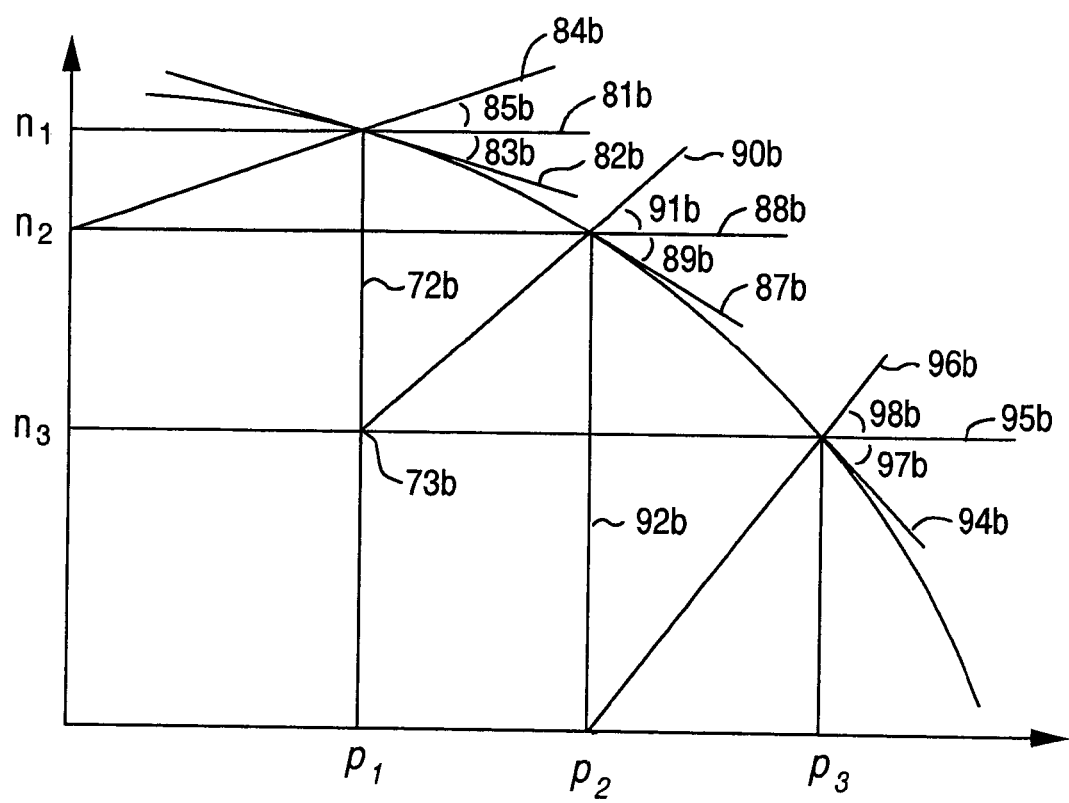
FIG. 7D illustrates an exemplary demand curve and illustrates steps of method 600 of FIG. 6 at an exemplary price $P_n$ for determining three prices that maximize revenue in accordance with an embodiment of the present invention.

FIG. 7D shows an exemplary calculation performed at a different price $p_1$. In this embodiment, a tangent line 82b is calculated that is at an angle 83b from first reference line 81b, giving a second reference line 84b that is at an angle 85b from first reference line 81b. The second reference line 84b intersects the y-axis at $n_2$ units, giving a price $p_2$. At $p_2$, tangent line 87b is calculated that is at an angle 89b from first reference line 88b, giving a second reference line 90b that is at an angle 91b from first reference line 88b. The second reference line 90b intersects vertical reference line 72b at point 73b. Point 73b corresponds to $n_3$ units, giving a price $p_3$.

In the embodiment shown in FIG. 7D geometric error is calculated by calculating tangent line 94b that is at an angle 97b from first reference line 95b, giving a second reference line 96b that is at an angle 98b from first reference line 95b. The second reference line 96b intersects vertical reference line 92b ($p_2$) at the x-axis, giving an error of zero.

Though the steps of methods 600 is discussed with reference to angles and lines that are geometrically located, calculated or drawn, in the present embodiment, methods 600 is performed using mathematical calculations entirely performed within a computing device.

Determining Prices that Maximize Revenue for Multiple Products

Method 800 illustrates a method for determination of prices for multiple products that optimizes revenue. In the present embodiment, revenue is maximized for a given budgetary constraint. More particularly, for a given set of demand curves shown to be provided in step 801 and a set of initial prices are provided in step 806, and number of prices shown to be provided in step 802, prices that maximize revenue are determined.

As shown by step 801 demand curves are provided. In the present embodiment, the demand curves are arbitrary demand curves that are provided as sets of points that make up each demand curve. Alternatively, a representation of a demand curve can be scanned or otherwise entered into a computer such as computer 10 of FIG. 2.

As shown by step 802 the number of prices to be determined is provided. More particularly, the number of prices to be determined is provided for each demand curve provided in step 801. The number of prices need not be the same for different demand curves. Thus, for example, two prices could be provided for a first demand curve while three prices could be provided for a second demand curve, etc.

A multiplier value is also provided as shown by step 803. In the present embodiment, the multiplier value is a Lagrange multiplier that is a positive number expressed in percentage terms (e.g., ten percent or 0.10). Any of a number of methods can be used to select an initial Lagrange multiplier. In one embodiment, the multiplier is chosen arbitrarily. Irrespective of the initially chosen Lagrange multiplier, method 800 will converge towards the correct result as the process of method 800 progresses.

Figure 8:
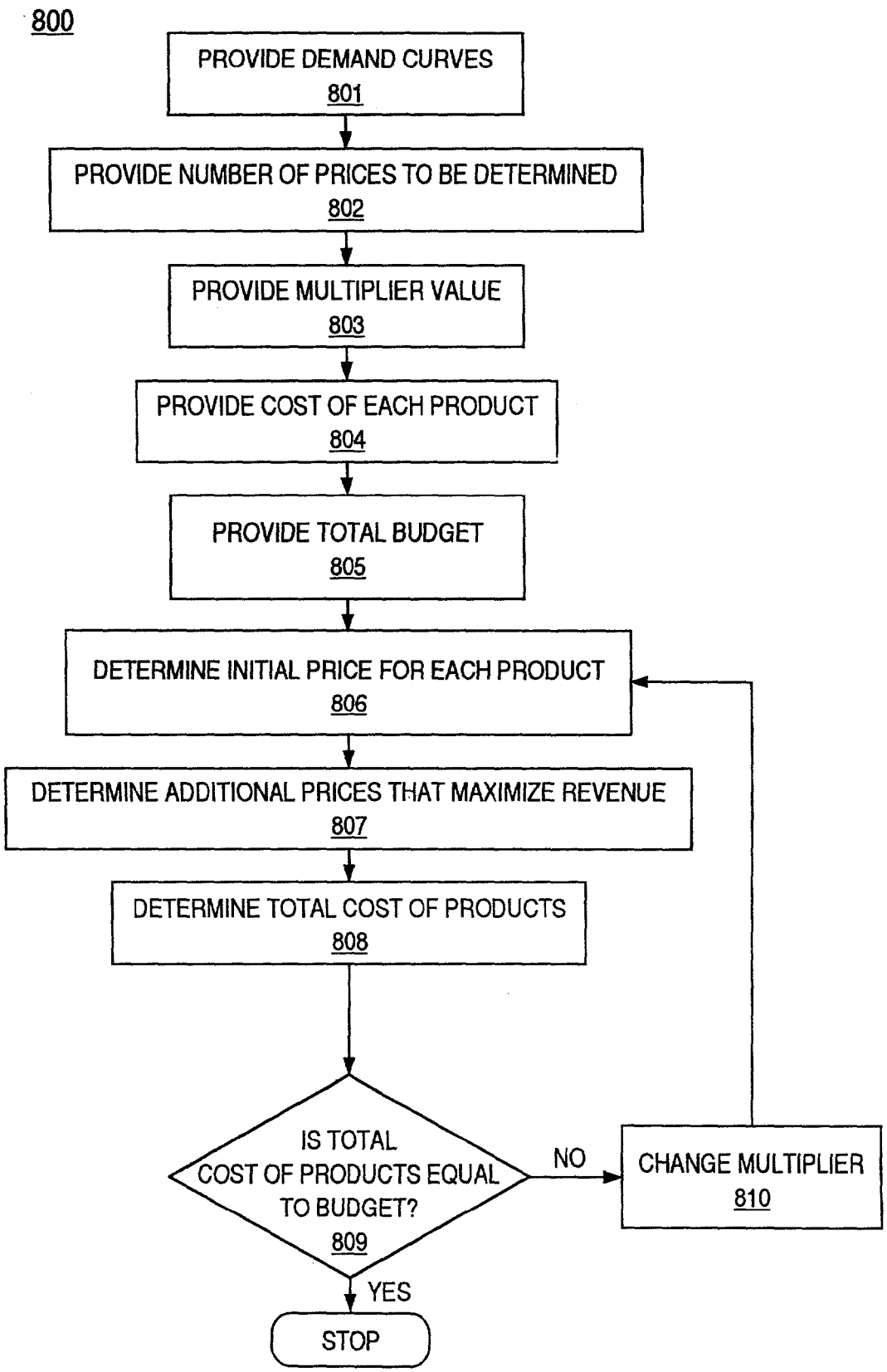
FIG. 8 shows a method for determining prices for a plurality of products having demand curves in accordance with an embodiment of the present invention.

Continuing with FIG. 8, the cost of each product is provided as shown in step 804. More particularly, a cost is provided that relates to each demand curve provided in step 801, with the cost representing the cost of the product represented by the demand curve.

A total budget is provided as shown by step 805. More particularly, an amount (e.g., a dollar amount) is provided that represents the total budget for purchase of all products.

Figure 9A:
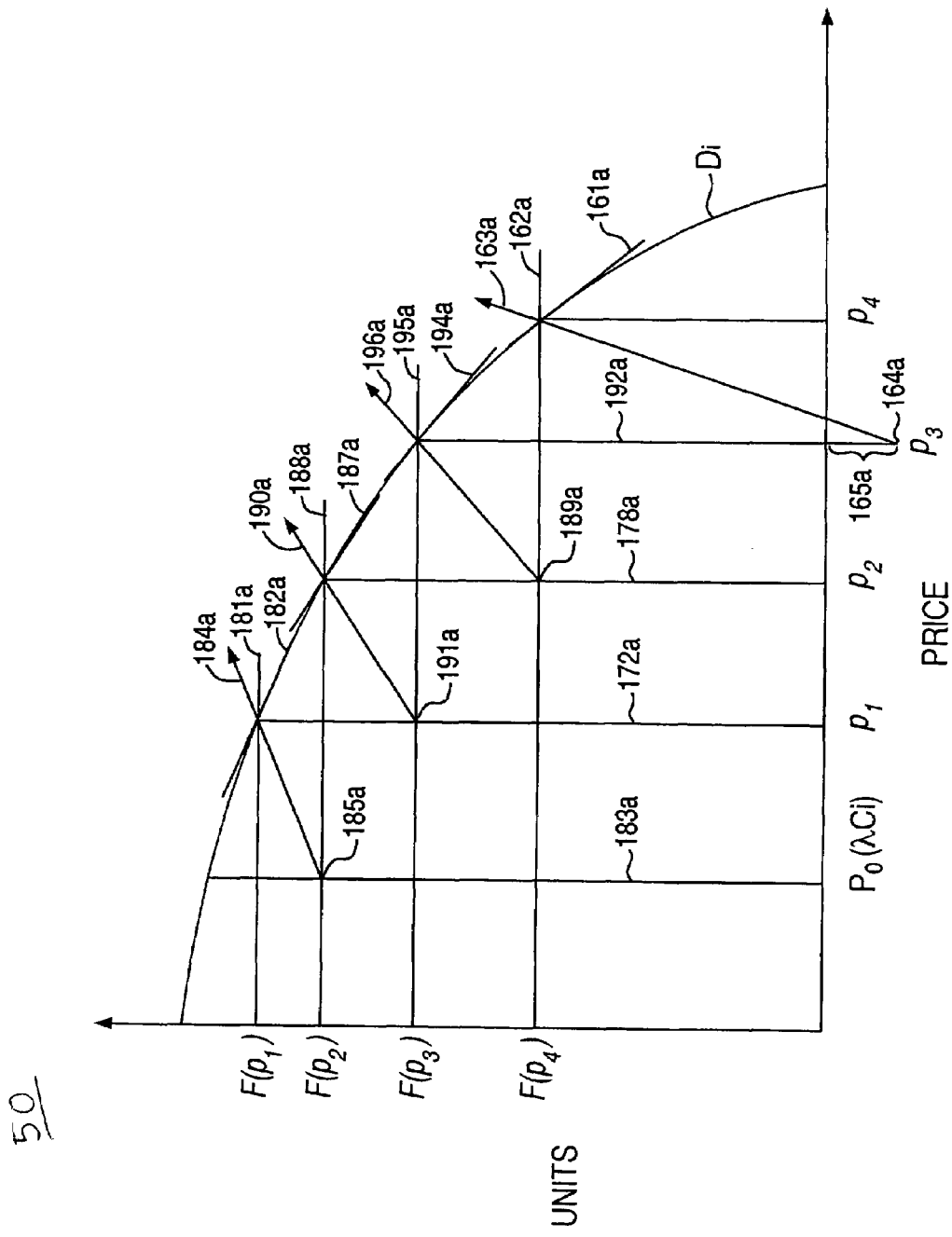
FIG. 9A shows an exemplary demand curve and illustrates steps of method 800 of FIG. 8 for calculating four prices in accordance with an embodiment of the present invention.
Figure 9B:
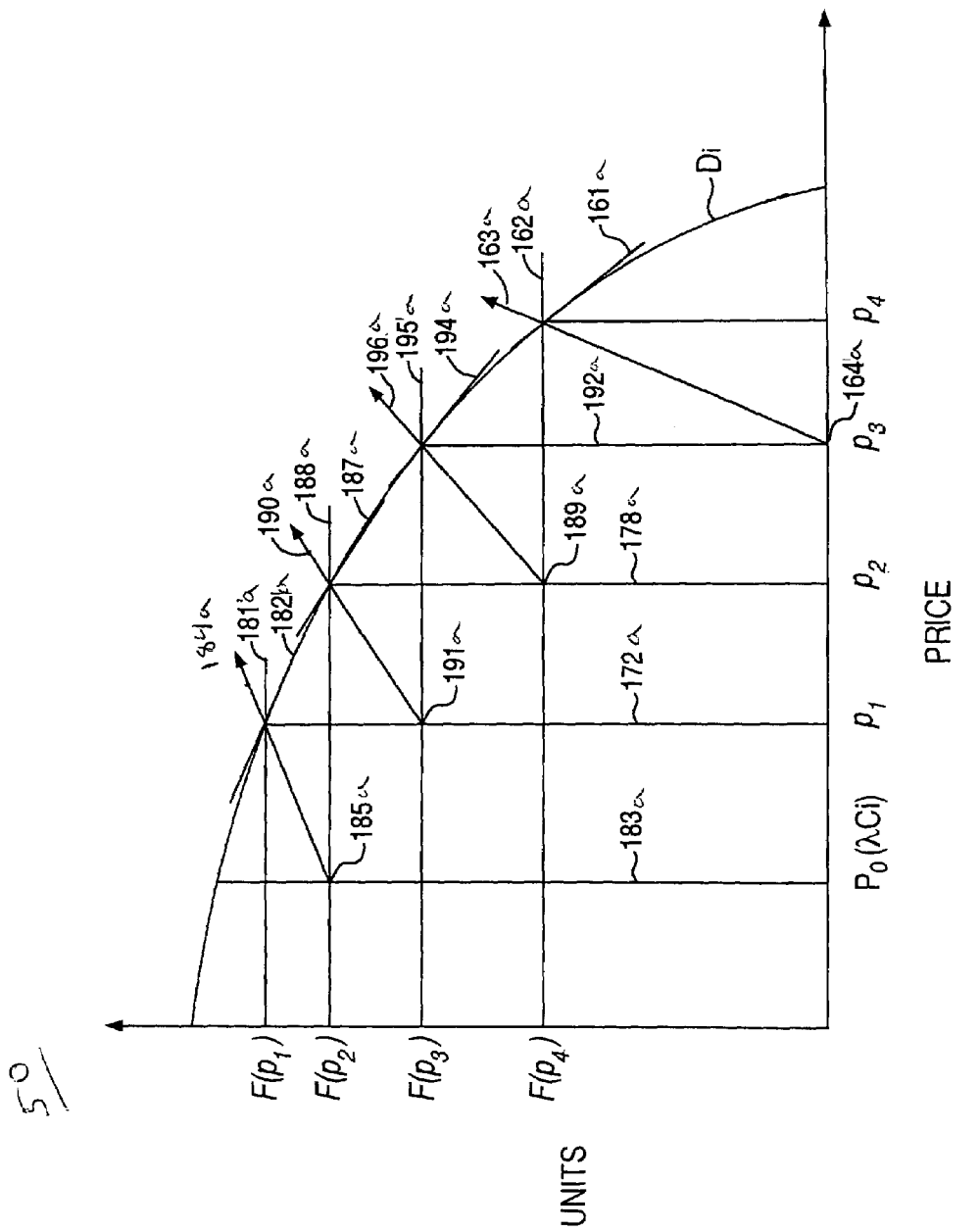
FIG. 9B illustrates steps of method 800 of FIG. 8 for calculating four prices that maximize revenue in accordance with an embodiment of the present invention.

FIGS. 9A–9B illustrate determination of prices for a product$_i$ in accordance with method 800 of FIG. 8. It is appreciated that product$_i$ is an exemplary product that is one of a plurality of products designated as products i . . . n, with n being the total number of products for which prices are to be determined. In the present example, product$_i$ has a demand curve D$_i$ (provided in step 801). The number of prices to be determined (input in step 802) for product$_i$ is five. The cost for the product$_i$ is represented by the variable c$_i$, and is input in step 804.

Referring to step 806, the initial price or p$_0$ for each demand curve is set to be proportional to the cost of the product. More particularly, in the present embodiment, the cost associated with each product is multiplied by the multiplier provided in step 803 to determine an initial price p$_0$ for each product. As shown by step 806, the initial price p$_0$ is determined. In the embodiment shown in FIG. 9A, the initial price p$_0$ is the cost c$_i$ multiplied by the multiplier $\lambda$.

Additional prices are then determined that maximize revenue as shown by step 807. More particularly, for each demand curve provided in step 801, prices are determined (with the number being equal to the number provided in step 802) that maximize revenue. In the present embodiment, the steps of methods 100, 500 or 600 are performed to determine prices that maximize revenue by finding the optimal p$_1$ for each demand curve under the chosen p$_0$. More particularly, when one additional price is to be determined method 100 is used and when two or more additional prices are to be determined methods 500 or 600 are used to determine the additional prices. This is done for each demand curve provided in step 801. Because the initial price p$_0$ is set in step 806, the number of additional prices to be determined is the number of prices input in step 802 less one. In the embodiment shown in FIG. 9, the number of prices to be determined (input in step 802) is five, giving a number of additional prices to be determined of four.

In the embodiment shown in FIG. 9A, because multiple additional prices are to be determined, method 600 of FIG. 6 is used to determine prices that maximize revenue. In the present embodiment, the first price that is provided (step 503), shown as price p1 is a price greater than price p$_0$. The first price p$_1$ intersects demand curve 50 at n$_1$ units which is a function of p1, shown as F (p$_1$). The tangent line 182a to demand curve 50 at first price p$_1$ is calculated (step 601). Using the first reference line 181a, the location of second reference line 184a is determined (step 602).

In the present embodiment the initial price of p$_0$ is used as a first vertical reference line. Thus, in the embodiment shown in FIG. 9A, line 183a is used as a first vertical reference line. The intersection of the second reference line 184a and vertical reference line 183a (step 603) is at point 185a which gives a price p$_2$ and a corresponding number of units shown as F (p$_2$).

The next iteration of steps 601–605 gives tangent line 187a (step 601), first reference line 188a and second reference line of 190a. The intersection of the second reference line 190a and vertical reference line 172a (step 603) is at point 191a which gives a price p$_3$ and a corresponding number of units shown as F (p$_3$). Similarly, the next iteration of steps 601–605 gives tangent line 194a (step 601), first reference line 195a and second reference line of 196a. The intersection of the second reference line 196a and vertical reference line 178a (step 603) is at point 189a which gives a price p$_4$ and a corresponding number of units shown as F (p$_4$).

The geometric error is then determined (step 606) by calculating tangent line 161a, first reference line 162a and second reference line 163a. The intersection of the second reference line 163a and vertical reference line 192a at point 164a gives an error 165a. Because geometric error is not minimized (step 607), the first price is changed and steps 601–607 are again performed using the newly determined first price until such time that a first price is obtained that minimizes error. FIG. 9B shows an exemplary calculation performed at a different price p$_1$ that produces an intersection between second reference line 163b and vertical reference line 192b, shown as point 164b (that lies on the x-axis) that gives an error of zero. Therefore, prices p1–p4 from FIG. 9B are determined to be the prices that maximize revenue (step 807) for demand curve D$_i$.

The total cost of products is determined as shown by step 808 of FIG. 8. In the present embodiment, total cost is determined by determining the total number of units indicated by the prices determined in step 807 for each product and multiplying the total number of units by the cost of the product. Thus, in the example shown in FIG. 9B, the number of units corresponding to each of prices p$_1$–p$_4$ are summed to obtain the total number of units to be sold. The total number of units to be sold is then multiplied by price c$_i$ to obtain the cost of product$_i$. The process is repeated for each product and the results are summed to obtain the total cost associated with all products.

As shown by step 809, the total cost of products is compared with the total budget (entered in step 805). If the total cost of products is not equal to the budget as shown by steps 809–810, the multiplier is changed and the process of steps 806–809 is repeated until a multiplier is found that gives a total cost of products that is equal to the budget. In the present embodiment the multiplier is increased when the total cost of products is less than the budget and the multiplier is decreased when the total cost of products is greater than the budget.

When the total cost of products is found that is equal to the budget, the process ends. The additional prices determined in step 807 are prices that maximize revenue. Moreover, the total cost of products is within the budgetary constraints provided in step 805. Though the present invention is described as finding a total cost of product that is equal to the budget, alternatively, a total cost could be found that is near or close to the amount of the budget. For example, a total cost could be found that is within a given threshold from the budget (e.g., under the budget by a certain percentage of the budget). In one embodiment, when the total cost of product is found that is under the budget by one percentage of the budget or less, the process ends.

Though the steps of methods 600, and 800 are discussed with reference to angles and lines that are geometrically located, calculated or drawn, in the present embodiment, methods 600 and 800 are performed using mathematical calculations entirely performed within a computing device. For example, in the embodiment shown in method 800 the following equation is used to determine prices that maximize revenue and that meet the budgetary constraints input in step 805.

In one embodiment, method 800 is performed so as to determine multiple prices for each demand curve in which total revenue calculated using the following equation:

$$r(\{P_{i,j} \mid i, j\}) = \sum_{i=1}^{N} \sum_{j=1}^{m_j} p_{i,j} * n_{i,j} = \sum_{i=1}^{N} \sum_{j=1}^{m_j} p_{i,j} * [F_i(p_{i,j}) - F_i(p_{i,j+1})].$$

In the present embodiment, total revenue is maximized using the equation: max r ($\{p_{i,j}|i,j\}$) under the constraint of the budget as indicated by the equation:

$$\sum_{i=1}^{N} c_i \left( \sum_{j=1}^{m_1} n_{i,j} \right) = \sum_{i=1}^{N} c_i \sum_{j=1}^{m_i} [F_i(p_{i,j}) - F_i(p_{i,j+1})] \leq B$$

under the constraint that no product will be sold at below its cost ($p_{i,j} \geq c_i$).

Accordingly the method and apparatus of the present invention determines prices that maximize revenue for a product having a demand curve. Also, the method and apparatus of the present invention determines either a single price or multiple prices that maximize revenue for a demand curve having an arbitrary shape that is concave. In addition, the method and apparatus of the present invention determines prices that maximize revenue in a multiple product environment.

The preferred embodiment of the present invention, a method and apparatus for determining prices that maximize revenue, is thus described. While the present invention has been described in particular embodiments, it should be appreciated that the present invention should not be construed as limited by such embodiments, but rather construed according to the below claims.

What is claimed is:

1. A method for determining a price that maximizes revenue comprising:
   providing a demand curve;
   determining position information associated with a first reference line and a second reference line;
   accessing a first angle, said first angle calculated by determining the angle between said first reference line and said second reference line;
   accessing a second angle, said second angle calculated by determining the angle between said first reference line and a line running tangent to said demand curve at said price;
   determining whether said first angle is equal to said second angle;
   changing said price and accessing said first angle, accessing said second angle, and determining whether said first angle is equal to said second angle until a price is found at which said first angle is equal to said second angle; and
   outputting said price that maximizes revenue in a tangible form which is a communication perceivable to a user of said method.

2. The method of claim 1 wherein said demand curve can be plotted on a graph that includes an origin and that indicates units on a first axis and price on a second axis, and wherein said first reference line is parallel to said second axis and passes through said demand curve at said price, said second reference line passing through said origin and passing through said demand curve at said price.

3. The method of claim 2 wherein an initial price is the lowest price on said demand curve and wherein said price is increased incrementally until a price is found at which said first angle equals said second angle.

4. The method of claim 2 wherein said demand curve has an arbitrary structure that is concave.

5. For a product having a demand curve, a method for determining prices that maximize revenue comprising:
   performing a geometric calculation using a first price so as to determine a plurality of additional prices;
   determining geometric error associated with said first price and said additional prices;
   changing said first price when said first price does not minimize said geometric error;
   performing said geometric calculation, determining said geometric error and changing said first price until a first price is found that minimizes said geometric error; and
   outputting said price that maximizes revenue in a tangible form which is a communication perceivable to a user of said method.

6. The method of claim 5 wherein said demand curve can be plotted on a graph that includes units on a first axis and price on a second axis, and wherein performing a geometric calculation using a first price further comprises:
   calculating a tangent line that is tangent to said demand curve at said first price;
   determining the location of a second reference line;
   determining where said second reference line intersects a vertical reference line; and
   calculating an additional price that corresponds to the determined intersection between said second reference line and said vertical reference line.

7. The method of claim 6 wherein determining location of said second reference line further comprises locating said second reference line such that the angle between said second reference line and a first reference line is equal to the angle between said tangent line and said first reference line, said first reference line and said second reference line extending through said demand curve at said first price.

8. For a plurality of products having demand data, a method for determining prices that maximize revenue for each of said products comprising:
   determining an initial price for each product by multiplying the cost of each product by a multiplier;
   determining additional prices that maximize revenue for each product; determining the total cost of said plurality of products;
   changing said multiplier when said total cost of said products is not equal to a budget;
   continuing to perform said determining an initial price, determining additional prices, determining the total cost, and changing said multiplier until said total cost of said products is near the amount of said budget; and
   outputting said price that maximizes revenue in a tangible form which is a communication perceivable to a user of said method.

9. The method of claim 8 wherein determining said additional prices that maximize revenue further comprises:
   performing a geometric calculation using said initial price and using a first price so as to determine a plurality of additional prices;
   determining geometric error associated with said first price and said additional prices;
   changing said first price when said first price and said additional prices do not minimize said geometric error; and
   performing said geometric calculation, determining said geometric error and changing said first price until a first price and additional prices are found that minimize said geometric error.

10. The method of claim 8 wherein said demand data can be plotted as a curve that has an arbitrary structure that is concave over a range of prices.

11. In a computer system including a processor coupled to a bus, and a memory unit coupled to the bus for storing information, a computer-implemented method for determining prices that maximize revenue for a product having a demand curve comprising:

performing a geometric calculation using a first price and using said demand curve so as to determine a plurality of additional prices;

determining geometric error associated with said first price and said additional prices;

changing said first price when said first price does not minimize said geometric error;

performing said geometric calculation, determining said geometric error and changing said first price until a first price and additional prices are found that minimize said geometric error; and outputting said price that maximizes revenue in a tangible form which is a communication perceivable to a user of said method.

12. The computer-implemented method of claim 11 wherein said step of performing a geometric calculation using a first price further comprises:

calculating a tangent line that is tangent to said demand curve at said first price;

determining the location of a second reference line;

determining where said second reference line intersects a vertical reference line; and calculating an additional price that corresponds to the determined intersection between said second reference line and said vertical reference line.

13. The computer-implemented method of claim 12 wherein determining location of said second reference line further comprises locating said second reference line such that the angle between said second reference line and a first reference line is equal to the angle between said tangent line and said first reference line, said first reference line and said second reference line extending through said demand curve at said first price.

14. The computer-implemented method of claim 12 wherein said demand curve has an arbitrary structure that is concave over a range of prices.

15. The computer-implemented method of claim 12 wherein said vertical reference line extends along a y-axis for determining a second price.

16. A computer-readable storage medium storing instructions that, when executed by a computer, cause the computer to perform a method for determining prices that maximize revenue for a product having a demand curve comprising:

performing a geometric calculation using a first price and using said demand curve so as to determine a plurality of additional prices;

determining geometric error associated with said first price and said additional prices;

changing said first price when said first price does not minimize said geometric error; and performing said geometric calculation, determining said geometric error and changing said first price until a first price and additional prices are found that minimize said geometric error.

17. The computer-readable storage medium of claim 16 wherein said demand curve has an arbitrary structure that is concave.

18. The computer-readable storage medium of claim 16 wherein said step of performing a geometric calculation using a first price further comprises:

calculating a tangent line that is tangent to said demand curve at said first price;

determining the location of a second reference line;

determining where said second reference line intersects a vertical reference line; and calculating an additional price that corresponds to the determined intersection between said second reference line and said vertical reference line.

19. The computer-readable storage medium of claim 18 wherein determining location of said second reference line further comprises locating said second reference line such that the angle between said second reference line and a first reference line is equal to the angle between said tangent line and said first reference line, said first reference line and said second reference line extending through said demand curve at said first price.

20. The computer-readable storage medium of claim 18 wherein said vertical reference line extends along a y-axis for determining a second price and wherein said vertical reference line is moved to a subsequent price upon each calculation of a new price.

* * * * *

UNITED STATES PATENT AND TRADEMARK OFFICE
CERTIFICATE OF CORRECTION

PATENT NO. : 7,200,579 B2
APPLICATION NO. : 10/038344
DATED : April 3, 2007
INVENTOR(S) : Bin Zhang et al.

It is certified that error appears in the above-identified patent and that said Letters Patent is hereby corrected as shown below:

In column 6, line 44, after "FIG. 2" insert -- is --.

In column 7, line 19, delete "$p_{,,}$" and insert -- $p_n$ --, therefor.

Signed and Sealed this

Twentieth Day of October, 2009

David J. Kappos
*Director of the United States Patent and Trademark Office*